US00RE49676E

(19) United States
(12) Reissued Patent
Wortman et al.

(10) Patent Number: US RE49,676 E
(45) Date of Reissued Patent: Oct. 3, 2023

(54) SYSTEM FOR FACILITATING WRAPPING AND TAPING OF ARTICLES WITH WRAPPING MATERIALS

(71) Applicant: Wrap Buddies Products LLC, Warrenton, VA (US)

(72) Inventors: Bret D. Wortman, Jeffersonton, VA (US); Robert D. Wortman, Urbandale, IA (US)

(73) Assignee: Wrap Buddies Products LLC, Warrenton, VA (US)

(21) Appl. No.: 17/519,230

(22) Filed: Nov. 4, 2021

Related U.S. Patent Documents

Reissue of:
(64) Patent No.: 10,472,114
Issued: Nov. 12, 2019
Appl. No.: 15/892,437
Filed: Feb. 9, 2018

U.S. Applications:
(63) Continuation-in-part of application No. 15/045,790, filed on Feb. 17, 2016, now abandoned.

(51) Int. Cl.
*B65B 67/08* (2006.01)
*B65B 61/00* (2006.01)
(Continued)

(52) U.S. Cl.
CPC ..... *B65B 67/08* (2013.01); *B65B 45/00* (2013.01); *B65B 61/005* (2013.01);
(Continued)

(58) Field of Classification Search
CPC ..... B65B 67/08; B65B 67/10; B65B 61/005; Y10T 225/246; Y10T 225/247; B65H 16/00; B65H 16/005; B65H 16/02; B65H 16/021; B65H 16/023; B65H 16/04; B65H 16/06; B65H 2701/194; B65H 35/008; B65H 35/002
See application file for complete search history.

(56) References Cited

U.S. PATENT DOCUMENTS 439,872 A * 11/1890 Haas ..... B65H 35/0006 225/80
487,520 A 12/1892 Gillette
(Continued)

FOREIGN PATENT DOCUMENTS

DE 19808538 A1 * 9/1998 ..... B26B 29/06
EP 0822101 A1 * 2/1998 ..... B26D 1/045
(Continued)

*Primary Examiner* — Patricia L Engie
(74) *Attorney, Agent, or Firm* — WC&F IP

(57) ABSTRACT

In a system for facilitating the wrapping and taping of articles with wrapping materials, two or more apparatuses adapted to be secured in adjacent spaced relation on a planar surface are provided so as to support a roll of wrapping material therebetween. Each apparatus has an upper frame member which supports an end of the roll thereon and which includes a cavity for dispensing desired lengths of tape therefrom, and a clamp member adapted to be actuated by a user to removably attach its corresponding apparatus to a ledge of the planar surface so that the supported roll is parallel to and above the planar surface.

17 Claims, 6 Drawing Sheets

(51) Int. Cl.

| | |
|---|---|
| ***B65H 16/00*** | (2006.01) |
| ***B65H 16/02*** | (2006.01) |
| ***B65H 35/00*** | (2006.01) |
| ***B65H 16/06*** | (2006.01) |
| ***B65B 45/00*** | (2006.01) |
| *B65B 61/06* | (2006.01) |

(52) U.S. Cl.
CPC ..... *B65H 16/005* (2013.01); *B65H 16/06* (2013.01); *B65H 35/008* (2013.01); *B65B 61/00* (2013.01); *B65B 61/06* (2013.01); *B65H 2701/1944* (2013.01)

(56) References Cited

U.S. PATENT DOCUMENTS 1,189,955 A 7/1916 James
1,231,415 A * 6/1917 Van Bibber ..... B65H 35/0006 225/20
1,952,374 A 3/1934 Hill
2,067,498 A 1/1937 Meyrowtiz
2,339,926 A 1/1944 Hays
2,447,145 A * 8/1948 Van Cleef ..... B65H 35/0026 225/18
2,588,092 A 3/1952 Duff
3,502,252 A * 3/1970 Mariani ..... B65H 35/0026 225/33
794,359 A 2/1974 Fisher
4,119,251 A * 10/1978 Golner ..... B65H 35/002 225/53
4,316,564 A * 2/1982 Felicetti ..... B65H 16/005 225/77
5,074,449 A * 12/1991 Slonneger ..... B26D 1/02 225/77
5,082,159 A * 1/1992 Gutierrez ..... B65H 35/002 225/34
5,277,351 A * 1/1994 McCullagh ..... A47F 13/085 225/38
5,297,749 A * 3/1994 White ..... A47K 10/3836 242/597.4
5,392,676 A * 2/1995 Drury ..... B26B 29/06 242/598
5,853,158 A * 12/1998 Rigg ..... A47G 23/0225 248/103
6,085,955 A * 7/2000 Hicks ..... B65H 35/0026 225/42
6,357,710 B1 * 3/2002 Fielden ..... A45B 11/00 248/231.51
6,761,298 B1 * 7/2004 Cantrell ..... B65H 35/002 225/42
6,883,292 B1 * 4/2005 Chen ..... B65B 67/08 53/390
7,566,025 B1 * 7/2009 Simonsen ..... A47K 10/40 242/596.3
D608,576 S * 1/2010 Goodman ..... D6/522
7,717,382 B2 * 5/2010 Whittemore ..... E04G 21/24 156/577
7,959,121 B1 * 6/2011 Barnes, Jr. ..... A47G 23/0225 224/148.4
8,602,662 B1 * 12/2013 Mans ..... F16M 11/041 248/160
8,740,162 B1 * 6/2014 Morgan ..... A47D 5/00 211/119.006
9,345,353 B2 * 5/2016 Forbes ..... G09F 21/04
D767,918 S 10/2016 Shaw
9,622,626 B1 4/2017 Radke
2002/0100786 A1 * 8/2002 Orihara ..... A47K 10/38 225/46
2003/0209122 A1 * 11/2003 Nguyen ..... B65H 16/06 83/522.11
2007/0034728 A1 * 2/2007 Moores ..... B65H 39/16 242/588.1
2007/0235494 A1 * 10/2007 Foran ..... B65H 35/0026 225/39
2014/0061230 A1 3/2014 Jonsson
2014/0332618 A1 * 11/2014 McNicholas ..... A47K 10/22 242/591
2015/0107192 A1 * 4/2015 Loibl ..... B65H 35/002 83/614

FOREIGN PATENT DOCUMENTS

FR 2697470 A1 * 5/1994 ..... B44C 7/025
GB 2188580 A * 10/1987 ..... B26D 7/28

* cited by examiner

SYSTEM FOR FACILITATING WRAPPING AND TAPING OF ARTICLES WITH WRAPPING MATERIALS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a Broadening Reissue application of U.S. Pat. No. 10,472,114, issued Nov. 12, 2019, from U.S. patent application Ser. No. 15/892,437, filed Feb. 9, 2018, which is a continuation-in-part of U.S. patent application Ser. No. 15/045,790, filed Feb. 17, 2016, now abandoned. The complete contents of all the foregoing applications are hereby incorporated by reference.*

BACKGROUND

Field

The example embodiments in general are directed to a system which facilitates the wrapping and taping of articles such as packages and gifts with wrapping materials such as a roll of wrapping paper wound around an elongate tube.

Related Art

Gift wrapping oft times is experienced as a time consuming chore. Typically, the evolution requires a number of steps. Initially, the wrapping materials (wrapping paper, scissors, ribbons/bows, small note cards, and tape, etc.) are gathered. Next, the gift/present and wrapping materials must be assembled on a clear, flat, planar surface such as a table that usually must be cleared in advance. If the present is fragile, it must be secured; wrapped securely so it won't move around or become damaged.

Next, one must measure out how much paper to cut. Typically this is done by rolling out the roll of wrapping paper, which may be cumbersome as it can (and often will) move along the table and even fall off the edge. The present is typically placed in the center of the unfurled paper, and the wrapping paper is brought up one side and over the top of the present to the opposite edge, while either holding the roll of wrapping paper or placing an object in its way to prevent roll away from the gift. The wrapper must then estimate how much additional paper they will need to cover the side of the present that's not yet covered, then cut the paper and proceed with wrapping and then taping the gift. For each subsequent present to wrap, the above must be repeated using the cumbersome, loose and free moving roll of wrapping paper.

U.S. Pat. No. 5,297,749 to White is submitted by Applicant as representing material prior art relevant to the example embodiment. Taken from the '749 patent, FIG. 1 is a perspective view of White's prior art bed mounted tissue roll holder apparatus installed on a rail of a bed, and FIG. 2 is an enlarged perspective view of the apparatus shown in FIG. 1. The bed mounted tissue roll holder apparatus 10 is designed to attach to a bed with a rail, as shown in FIG. 1. Apparatus 10 includes a first clamp leg 13 spring-biased relative to a second clamp leg 14, with a pivot axle 15 interposed therebetween, and a clamp leg spring 16 wound about the pivot axle 15 between the first and second clamp legs 13 and 14. A first jaw 17 is mounted to the first clamp leg 13, with a second jaw 18 mounted to the second clamp leg 14 in opposed facing relation to first jaw 17. Each jaw 17, 18 has a respective semi-cylindrical recess 19, 20 arranged in opposed facing relation to one another.

A first semi-cylindrical resilient insert 21 is mounted coextensively within the first jaw semi-cylindrical recess 19, with a second semi-cylindrical resilient insert 22 positioned coextensively within the second jaw semi-cylindrical recess 20. The first and second semi-cylindrical resilient inserts 21 and 22 each include engaging ribs (not shown) coextensively about a facing surface of each of the inserts 21, 22 to enhance engagement with the rail tube.

A vertically-extending mounting cylinder 27 is attached to first jaw 17 and includes an externally threaded top end arranged for receiving a threaded cylindrical cap 31 thereon. The cylindrical cap 31 includes a plurality of cap rods 32 orthogonally oriented relative to an axis through cylinder 27 and project radially to secure the tissue roll "T" between the rods 32 and the top of first jaw 17. Thus, roll T is mounted and secured relative to the spring clip structure, where the cap 31 is merely removed relative to the mounting cylinder 27 to permit ease of replenishment of the tissue roll T.

Applicant, in their co-pending and commonly assigned U.S. patent application Ser. No. 15/045,790, the entire contents of which is incorporated by reference herein, introduced an initial apparatus conceived for wrapping of articles and as such represents conventional art. FIGS. 3 and 4 are taken from the '790 application, with FIG. 3 representing a conventional art apparatus developed by Applicant for facilitating the wrapping of articles with wrapping materials; and FIG. 4 being an enlarged perspective view of the apparatus of FIG. 3 to illustrate the clamping assembly in more detail.

Referring now to FIGS. 3 and 4, there is shown a single apparatus 100, it being understood that a system for facilitating the wrapping of articles with wrapping materials includes two (2) of these apparatuses 100 secured (via corresponding clamp assemblies 120) to a vertical side edge or ledge 150 of a table in adjacent, spaced relation to one another, with each apparatus having an elongate holding member 130 oriented parallel to the planar surface and configured for insertion into each end of a roll (not shown) of wrapping material. Once the roll is secured between the spaced-apart apparatuses 100 of the system, the user simply grasps paper off the fixed roll and pulls it out to the desired length for cutting.

Each apparatus 100 includes a body 110 with a corresponding holding member 130 adapted for insertion into a hollow interior of an elongate tube of a roll of wrapping material. A clamp assembly 120 is attached to the body 110, and in general is adapted so as to be actuated by the user to removably attach the apparatus 100 to the ledge 150 of a planar surface (such as a table) so that the holding member 130 is oriented parallel to the surface of the table. Body 110 includes an integral flange 114 on which is formed a pair of posts 116 in spaced relation to each other.

The clamping assembly 120 includes an elongate; pivotable arm 121 which has a flange end 121A, and an articulating foot 125 attached thereto via a pair of spaced mandrils 129 formed at the terminal end on arm 121, each mandril 129 extending through a corresponding hole in foot 125. The flange end 121A supports a pair of integrally molded posts 123. The posts 123 cooperate and align with posts 116 (see FIG. 4), and are secured to a barrel 122 interposed therebetween. The barrel 122 includes a mandril 126 formed integral therewith at either end of the barrel 132, each mandril 126 adapted to extend through aligned holes formed in the respective posts 116, 123. The barrel 122 serves as the pivoting axis for the arm 121 of clamp assembly 120.

To actuate arm 121 and its attached foot 125, a user grasps the two flanges 114 and, bringing them together to overcome a spring counterforce of a metal or hard plastic spring 127 (which acts to maintain arm 121 "closed" up against a contact surface 118 of the body 110). Spring 127 is attached to barrel 122 and has arms bearing against respective surfaces of flanges 114, 121A, as best seen in FIG. 4. Accordingly, the arm 121 and its attached foot 125 pivot away from body 110 about the axis of barrel 122. The user releases the flanges 114, 121A so that the force of a metal or hard plastic spring 127 enables the foot 125 on arm 121 to contact the vertical side edge or ledge 150 of a planar surface such as a table, securing apparatus 100 thereto with the ledge 150 interposed between body 110 and foot 125.

SUMMARY

An example embodiment of the present invention is directed to a system for facilitating the wrapping and taping of articles with wrapping materials. The system include a pair of distinct and separate apparatuses with no physical connective structure connecting them together as an integral unit, one apparatus adapted to be secured in opposed, facing spaced relation to the other apparatus against a vertical side ledge of a table, each apparatus adapted to engage a respective end of a wrapping paper roll so as to support the wrapping paper roll therebetween. Each apparatus further includes an upper frame member adapted to contact a horizontal table top surface with bearing pressure and including an elongate spindle formed on an inner facing side surface thereof which extends from the inner facing side surface in a direction transverse thereto and which is adapted for insertion into a hollow interior end of the wrapping paper roll. The upper frame member further includes a recessed cavity formed therein on a side opposite that of spindle, the cavity adapted to retain a tape roll therein to access desired tape lengths in the taping of the articles with wrapping paper, and a rear upper flange member providing a grip surface for grasping by the thumb of a user. Each apparatus further includes a pivotable clamp member attached to the upper frame member at a hinge axle, the clamp member adapted to be actuated against spring pressure so as to open relative to the upper frame member and attach the apparatus to the vertical side ledge of the table, with the clamp member and the upper planar member contacting respective table top and underside surfaces of the table with bearing pressure so that the spindle is parallel to the table top.

Another example embodiment is directed to a system for facilitating the wrapping and taping of articles with wrapping materials. The system includes a pair of distinct and separate apparatuses, each adapted to be secured in opposed, facing spaced relation to the other apparatus against a vertical side ledge of a table for securing a wrapping paper roll therebetween. Each apparatus further includes a fixed upper frame member adapted to contact a horizontal table top surface with bearing pressure and including an elongate spindle which extends from an inner facing side surface thereof toward its opposite spindle of the other apparatus. The upper frame member further includes a cavity adapted to retain a tape roll therein accessible for the taping of the articles with wrapping paper. Each apparatus further includes a pivotable clamp member attached to the upper frame member at a hinge axle, the clamp member adapted to be actuated against spring pressure so as to open relative to the upper frame member and attach the apparatus to the vertical side ledge of the table.

Another example embodiment is directed to a system for facilitating the wrapping and taping of articles with wrapping materials, two or more apparatuses adapted to be secured in adjacent spaced relation on a planar surface are provided so as to support a roll of wrapping material therebetween. Each apparatus has an upper frame member which supports an end of the roll thereon and which includes a cavity for dispensing desired lengths of tape therefrom, and a clamp member adapted to be actuated by a user to removably attach its corresponding apparatus to a ledge of the planar surface so that the supported roll is parallel to and above the planar surface.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION

Figure 1:
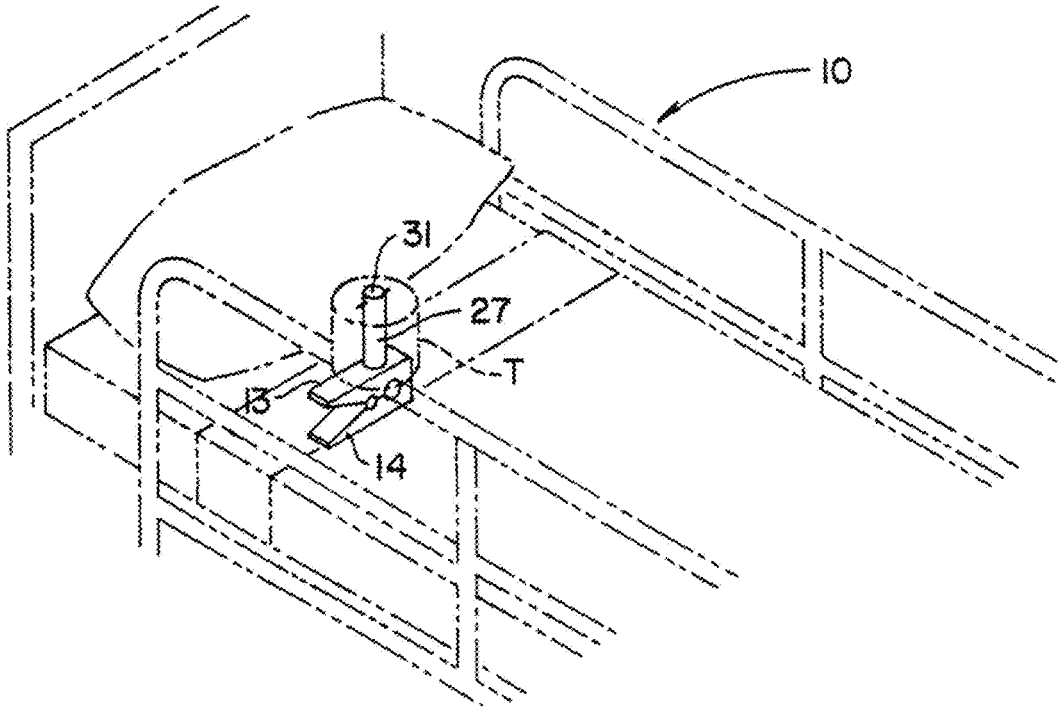
FIG. 1 (PRIOR ART)
FIG. 1 is a perspective view of a prior art bed mounted tissue roll holder apparatus installed on a rail of a bed.
Figure 2:
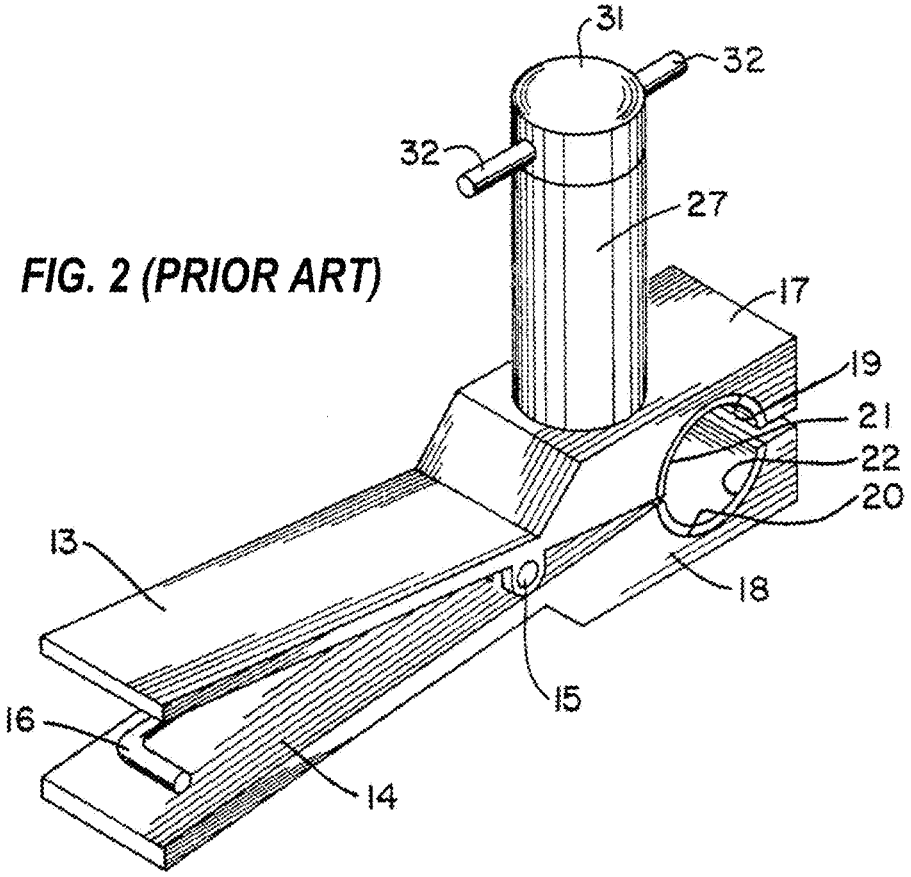
FIG. 2 (PRIOR ART)
FIG. 2 is an enlarged perspective view of the prior art apparatus shown in FIG. 1.
Figure 3:
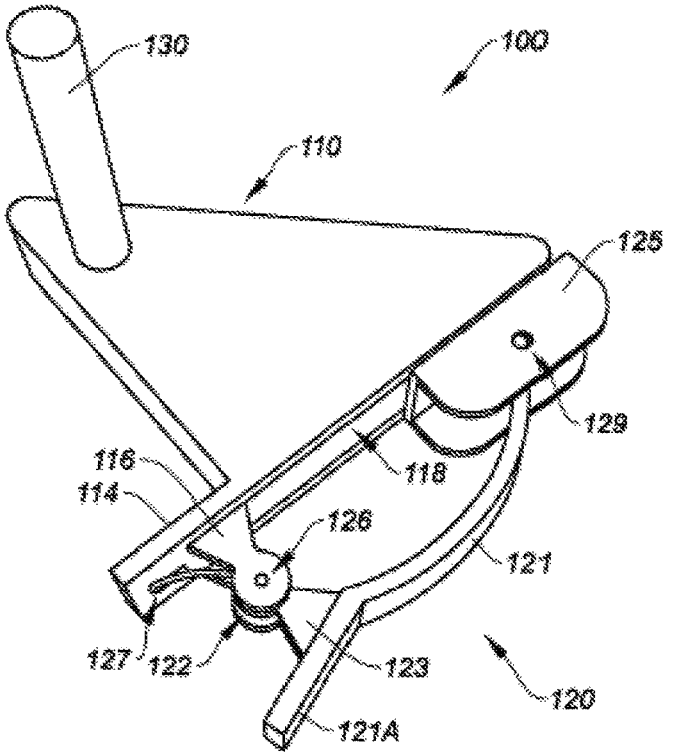
FIG. 3 (CONVENTIONAL ART)
FIG. 3 is a conventional apparatus developed by Applicant for facilitating the wrapping of articles with wrapping materials.
Figure 4:
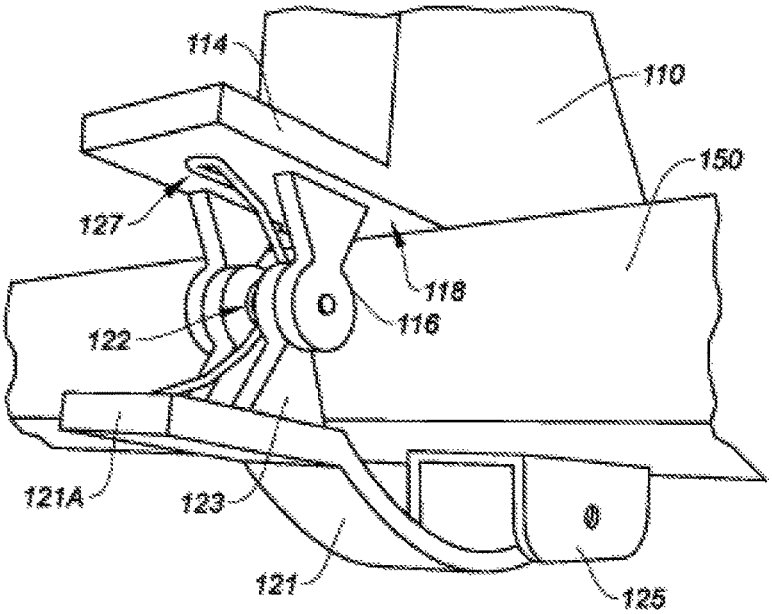
FIG. 4 (CONVENTIONAL ART)
FIG. 4 is an enlarged perspective view of the conventional art apparatus of FIG. 3 to illustrate the clamping assembly in more detail.
Figure 5:
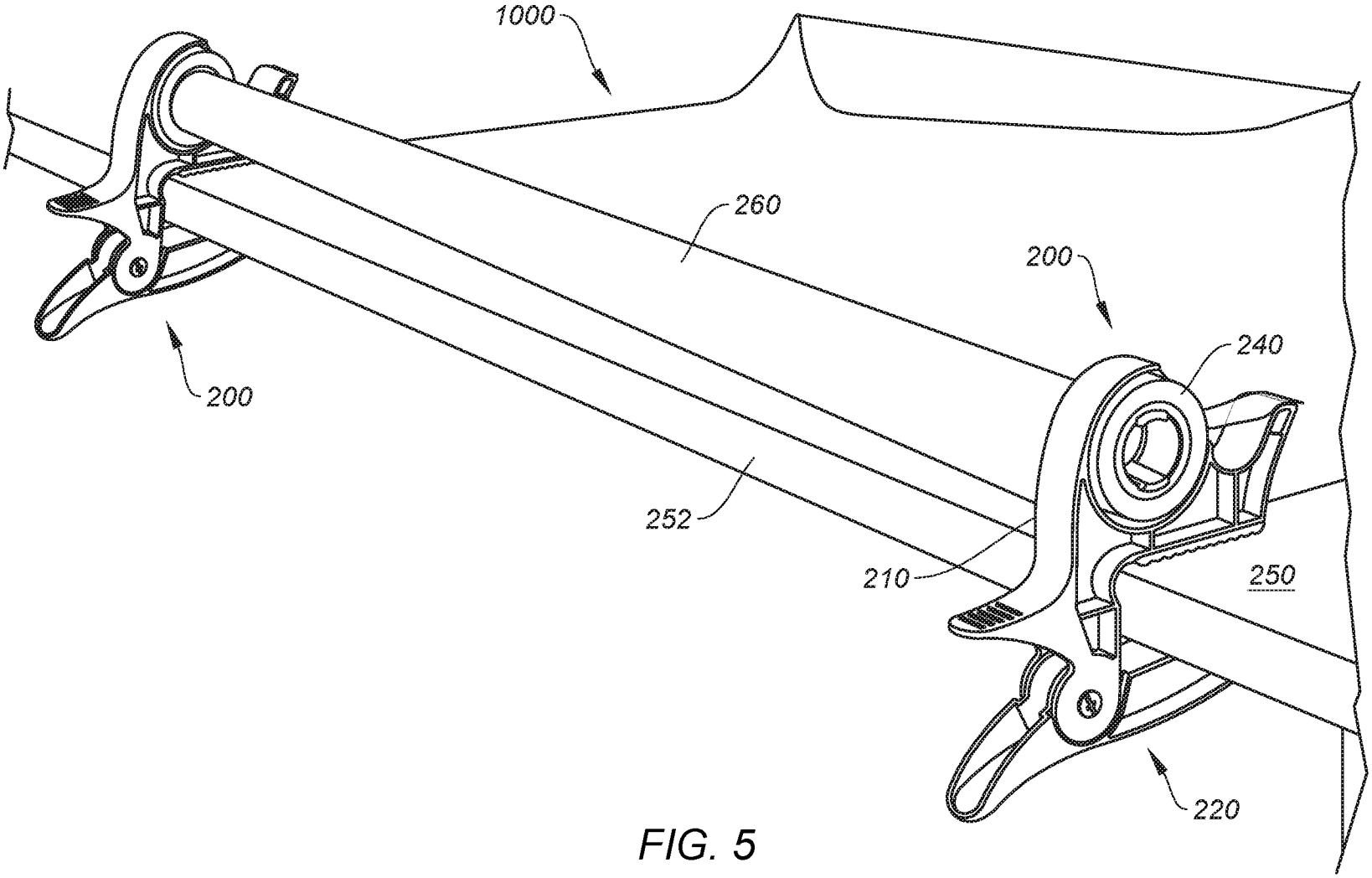
FIG. 5 is a perspective view of a system installed on a vertical side edge of a table for facilitating the wrapping and taping of articles with wrapping materials, according to the example embodiments.
Figure 6:
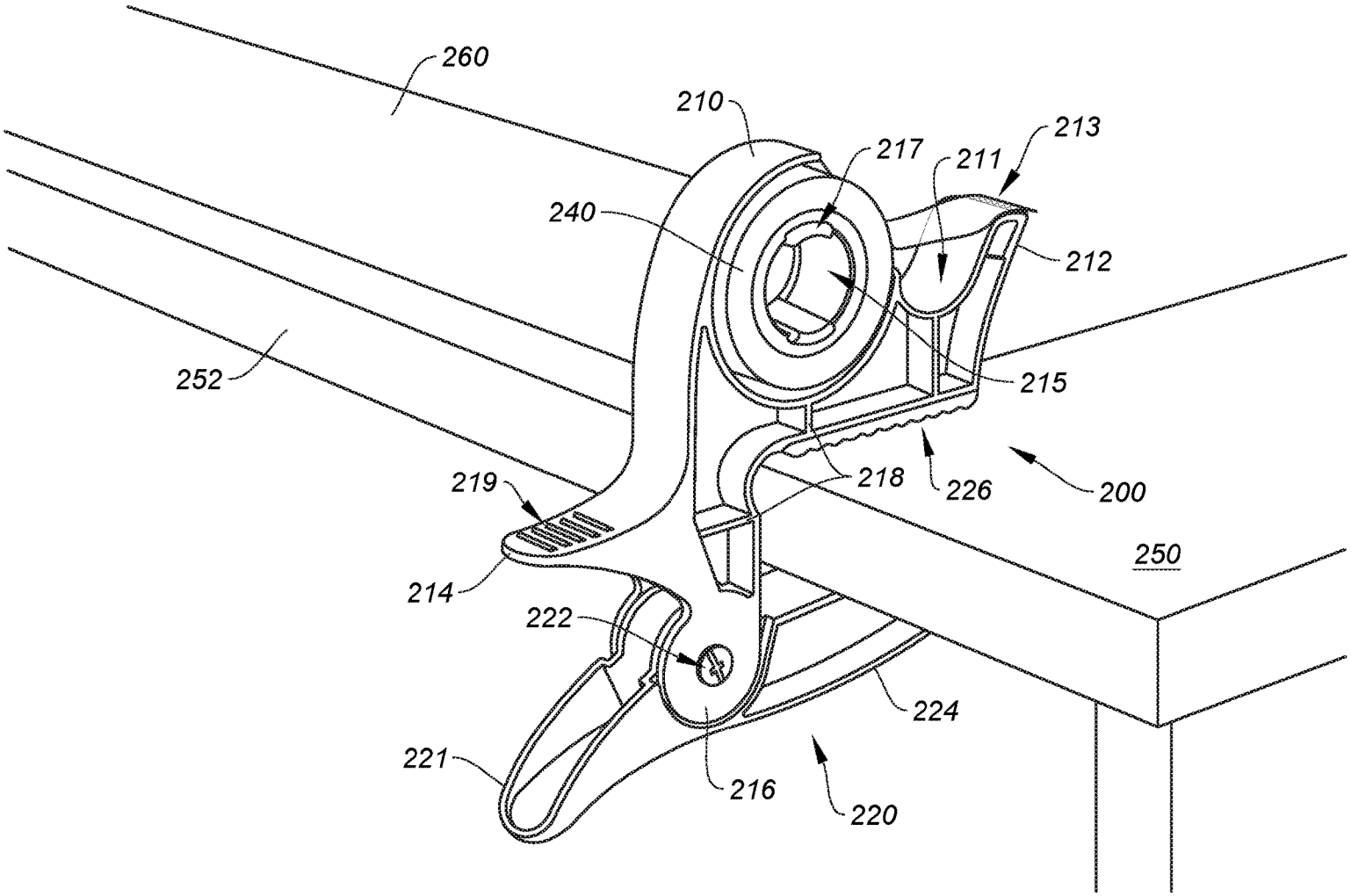
FIG. 6 is an enlarged perspective right-side view of one of the apparatuses of the system of FIG. 5 to show additional detail.
Figure 8:
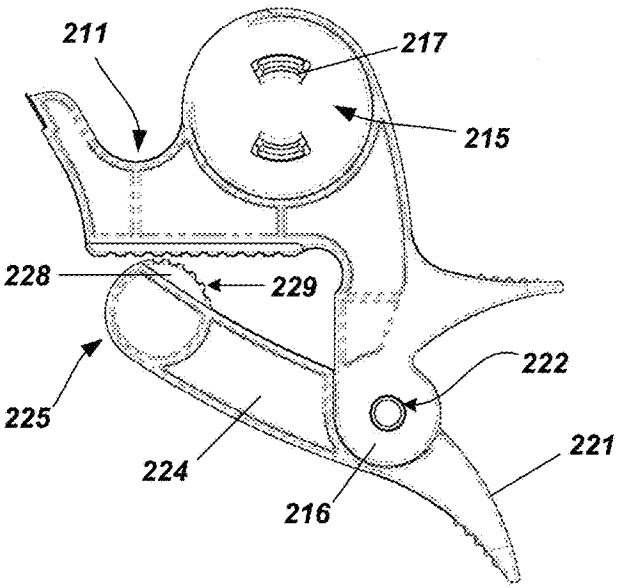
FIG. 8 is a left-side elevational view of the left-side installed apparatus shown in FIG. 5.
Figure 10:
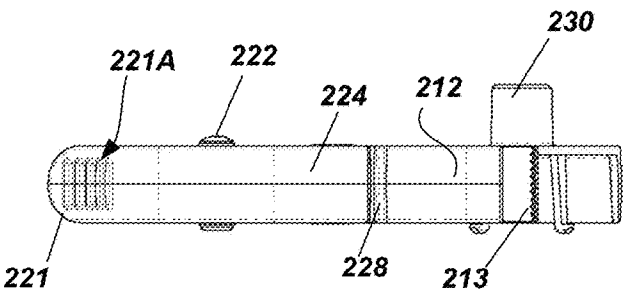
FIG. 10 is a bottom plan view of the left-side installed apparatus shown in FIG. 5.
Figure 7:
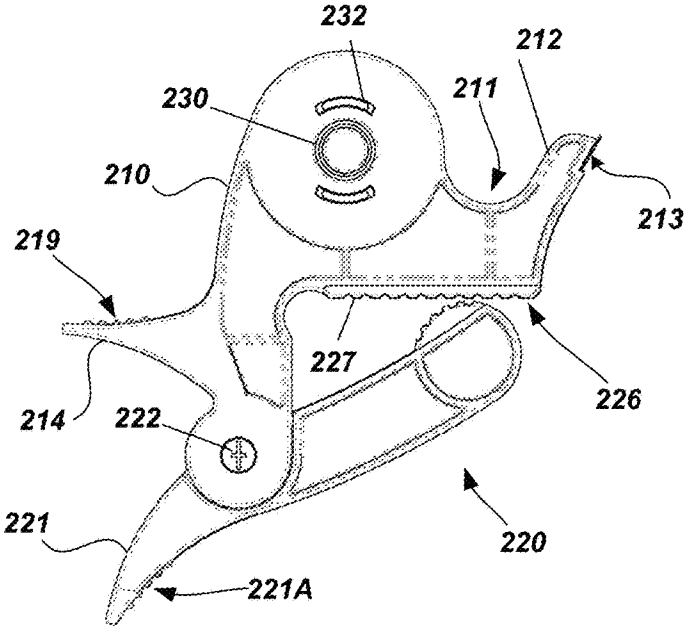
FIG. 7 is a right-side elevational view of the left-side installed apparatus shown in FIG. 5.
Figure 9:
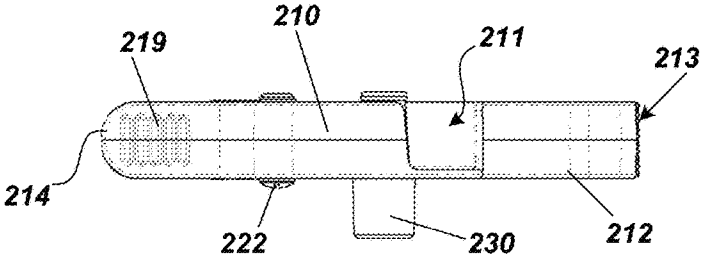
FIG. 9 is a top plan view of the left-side installed apparatus shown in FIG. 5.

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

The example embodiments hereafter describe a system for facilitating the wrapping and taping of articles with wrapping materials. FIGS. 5 through 11 are provided to describe the system according to an example embodiment. As shown, system 1000 includes a pair of identical apparatuses 200 in spaced facing relation to one another and installed at a vertical side edge of ledge 252 of a planar surface such as a table 250. Each apparatus 200 includes an upper frame member 210 having an elongate spindle 230 removably adapted for insertion into a hollow interior at a corresponding end of an elongate tube of a roll 260 of wrapping material. Upper frame member 210 may include a plurality of support ribs 218 to add strength. A slotted aperture 232 located both at top and bottom around spindle 230 is provided in a facing surface of the upper frame member 210 from which the spindle 230 extends.

Additionally, a clamp member 220 is attached to the upper frame member 210. In general, the clamp member 220 is pivotable relative to the fixed upper frame member 210 so that when actuated by the user to attach the apparatus 200 to a ledge 252 of a planar surface (such as table 250), an elongate planar contacting surface 226 of the upper frame member 210 contacts the horizontal surface of the table 250 top, and a semi-circular contacting element 228 at a distal end 225 (foot) of the clamp member 220 engages with bearing pressure to an underside surface of the table 250, securing apparatus to the ledge 252 so that the spindle 230 is oriented parallel to the surface of table 250. Thus, the system 1000 includes two (2) apparatuses 200 in spaced facing relation to one another, each adapted to be removably attached to the ledge 252 so as to support the roll 260 of wrapping material therebetween.

Upper frame member 210 may be formed by an injection molding process as a single molded piece or from two halves. Upper frame member 210 additionally includes an integral upper rear flange end 214 and a pair of posts 216 in spaced relation to each other and extending downward from upper rear flange end 214. A ribbed thumb grip surface 219 is provided on a top side of upper rear flange end 214. The upper frame member 210 also includes a semi-circular or curved trough 211 formed therein, located forward of spindle 230, and which terminates in an island element 212. On a front facing surface of the island element 212 is provided a serrated blade 213 which may be bonded thereto by an epoxy and the like.

Upper frame member 210 further includes a recessed or hollowed cavity 215 on a side opposite that of spindle 230 which is designed to receive a tape roll 240 therein. Namely, cavity 215 includes a pair of spaced tines 217 which extend outward therefrom and which are adapted to be inserted into the hollow middle of the tape roll 240 to secure tape roll 240 to the upper frame member 210 of apparatus 200. With the formation of trough 211, a user's fingers has access to pull tape from the tape roll 240 and cut at any desires length using the serrated blade 213 at the top of island element 212.

The clamp member 220 includes an elongate arm 224 extending between a lower rear flange end 221 and a foot or distal end 225 with the semi-circular contacting element 228 formed thereon. The lower rear flange end 221 includes a ribbed finger grip surface 221A on an underside thereof. A hinge axle 222 connects the upper frame member 210 to the clamp member 220. Specifically, the upper rear flange end 214 supports a pair of integrally molded posts 216. As shown, posts 216 cooperate and align with posts 223 that are integrally formed into the arm 224 of clamp member 220. Central holes in these posts 216, 223 are aligned and the posts 216, 223 are secured to the hinge axle 222 interposed therebetween. The hinge axle 222 serves as the pivoting axis for the arm 224 of clamp member 220 so that clamp member 220 can be pivoted to an open or closed position relative to the fixed upper frame member 210 and its fixed upper rear flange end 214.

Figure 11:
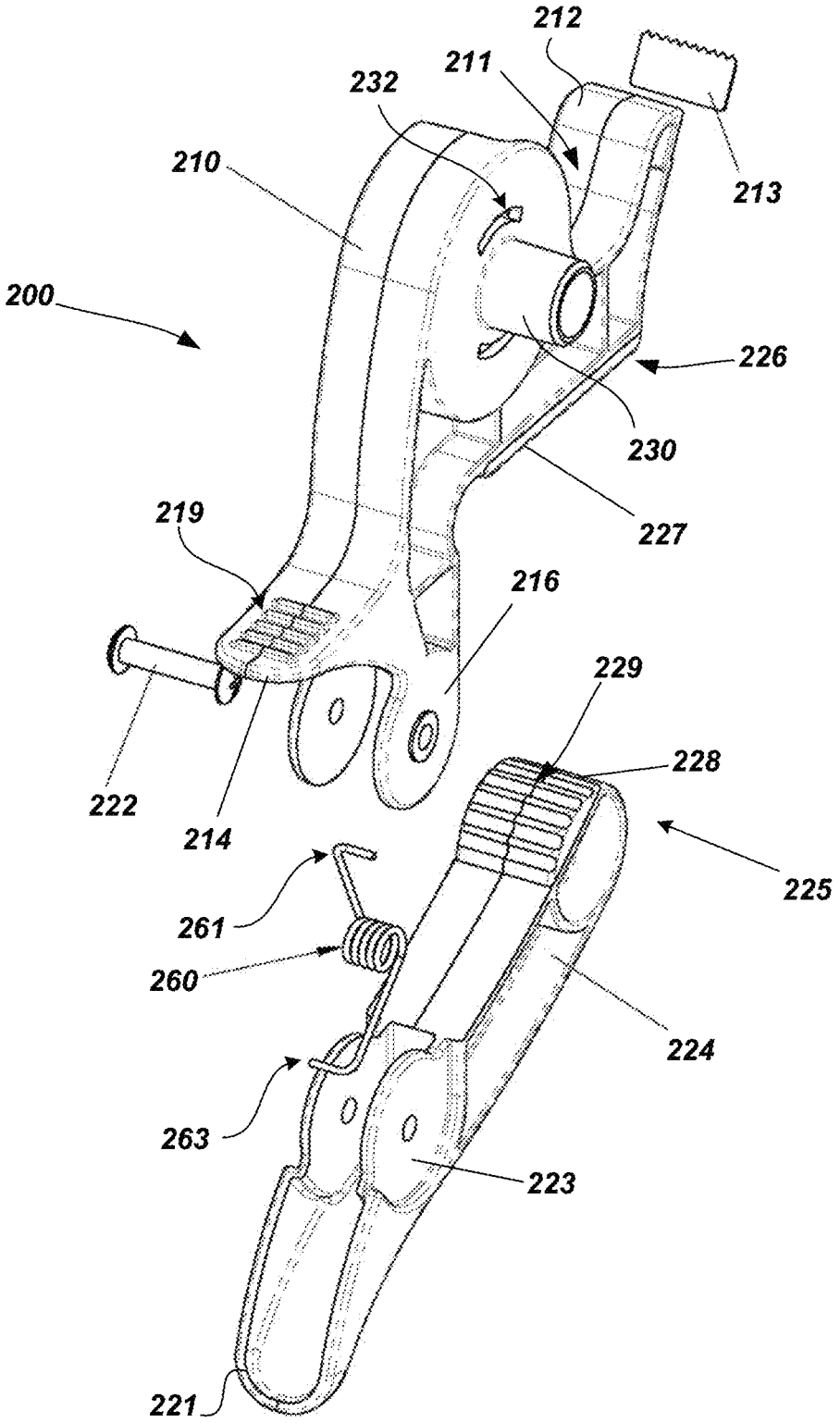
FIG. 11 is a partial exploded parts view of the left-side installed apparatus shown in FIG. 5.

To actuate arm 224, a user grasps the two flange ends 214 (thumb) and 221 (finger), bringing them together to overcome a spring counterforce of a metal or hard plastic spring 260 between posts 216, 223 (see FIG. 11, which has an upper tine 261 contacting an underside of upper rear flange end 214 and a lower tine 263 contacting a top surface of lower rear flange end 221 between posts 223 so as to maintain arm 224 "closed" up against the underside of upper rear flange 214). Spring 260 is attached to hinge axle 222 and has its tine ends 261, 263 bearing against respective surfaces of flange ends 214, 221.

Accordingly, in overcoming spring pressure, the arm 224 and its attached foot 225 pivot away from upper frame member 210 about the axis of hinge axle 222. The user positions apparatus 200 around a table ledge 252 (inserted in the spaced opening between upper frame member 210 and clamp member 220), and the releases the flange ends 214, 221 so that the force of the spring 260 enables the contacting element 228 at foot 225 to bear against and engage an underside surface of the table 250, thereby applying pressure to the elongate planar contacting surface 226 of the upper frame member 210, which is in contact with the horizontal surface of the table 250 top. This secures apparatus 220 to the ledge 252 so that the spindle 230 is oriented parallel to the surface of table 250.

With the apparatus 200 secured and the roll 260 in place on the opposing spindles, the user simply grasps paper off the fixed but rotatable roll 260 and pulls it out to the desired length for cutting. During the wrapping procedure, the user additionally may access desired lengths of tape off the roll 240 secured in cavity 215 by using the cutting blade 213 on apparatus 200. As such, system 1000 is anticipated to significantly reduce the amount of time required to wrap and tape one or more articles such as a gift or present, for example.

In one example, the upper frame member 210 (inclusive of its island element 212, upper rear flange end 214 and posts 216), clamp member 220 and its constituent elements may be constructed primarily from lightweight moldable plastic materials such as moldable plastic, e.g., as a single or multiple parts formed by an injection molding process using a high impact plastic such as Acrylonitrile Butadiene Styrene (ABS). ABS is an easily machined, tough, low cost rigid thermoplastic material with high impact strength, and may be a desirable material for turning, drilling, milling, sawing, die-cutting, shearing, etc. Virgin ABS may be mixed with a plastic regrind of ABS or another lightweight, durable plastic material. ABS is merely an example material, equivalent materials may include various thermoplastic and thermoset materials, such as talc-filled polypropylene, high strength polycarbonates such as LEXAN, available from GE, or blended plastics. There are many known injection molding machines for forming plastic injection molds, other plastic molding processes such as vacuum forming may be used.

In another example, one or more of the above constituent parts may be formed of a metal such as steel, Al and/or alloys of steel or aluminum using various know metalworking processes. These processes include but are not limited to CNC machining, sand casting, permanent mold casting, die casting, investment casting, ablation casting, closed-die forging, by extrusion, by cold heading, by stamping and deep drawing, via a screw machine, and through powder metallurgy, for example. The elongate planar contacting surface 226 ribbed elastomeric insert or covering 227. Similarly, the contacting element 228 on foot 225 may include a ribbed elastomeric insert or covering 229. As shown, these coverings 227, 229 serve as the bearing contact surfaces to the respective top and underside surfaces of table 250. These coverings 227, 229 may be composed of any of a rubber, urethane or like material, one example being silicon, and/or as a silicon or elastomeric-type material with or without UV inhibitors, combinations of these materials, etc.

The example embodiments having been described, it is apparent that such have many varied applications. For example, the example embodiments may be applicable but not limited to connection to various devices, structures and articles. Additionally, ganged systems of apparatus pairs 200 may be employed along a length of table. Here, and in a scenario where the wrapping evolution might be performed in a commercial setting, a number "n" of systems 1000 may be arranged in adjacent spaced relation and secured to a ledge of a planar surface. Thus, systems 1000 may be "chained" or "ganged" together in side-by-side, spaced relation, so as to be configured to support n rolls of material by using n+1 systems.

Further, the hinge axle 222 and arm 224 of the clamp member 220 have been shown herein as being two separate components, it being understood that these could be modularly formed through injection molding and the like as a single, integral component. Moreover, each apparatus 200 in system 1000 may be constructed so as to include multiple, removable lengths of the clamp member 220 so as to accommodate different-sized overhangs on a tabletop or other planar surface.

In yet another variation, the upper frame member 210 may include a slot or recess on a front facing surface or side of the island element 212 for fixedly but removably supporting one end of a cutting implement therein for facilitating cutting of the wrapping material, such as a serrated-edged cutter common on household wrapping containers (e.g., SARAN® Wrap), or alternatively merely a sharpened metal edge to tear against. In this respect, reference is made to applicant's co-pending '790 application which details various examples of how this may be effected. In general, a facing edge of serrated teeth of a cutting element (extending between the two apparatuses 200) is exposed to the paper on roll 260.

The present invention, in its various embodiments, configurations, and aspects, may include components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

We claim:

[1. A system for facilitating the wrapping and taping of articles with wrapping materials, comprising:

a pair of distinct and separate clamp apparatuses with no physical connective structure connecting the two distinct and separate clamp apparatuses together as an integral unit, one of the clamp apparatuses adapted to be secured in opposed, facing spaced relation to the other of the clamp apparatuses against a vertical side ledge of a table, the table having a top surface and an underside surface, each clamp apparatus adapted to engage a respective hollow interior end of a wrapping paper roll so as to support the wrapping paper roll between the clamp apparatuses, each clamp apparatus including:

an upper clamp frame member adapted to contact the top surface and including an elongate spindle integrally formed on an inner facing side surface of the upper clamp frame member, the spindle extending from the inner facing side surface in a direction transverse thereto, the spindle being adapted for insertion into the hollow interior end of the wrapping paper roll, the upper clamp frame member further including an accessible recessed cavity with an open front that is integrally formed in the upper clamp frame member on an outer surface of the upper clamp member that is opposite that of the spindle on the inner facing side surface, the cavity including a pair of spaced tines integrally formed as part of the upper clamp frame member, the spaced tines extending outward from the cavity toward the open front, the spaced tines adapted to retain a tape roll insertable directly onto the spaced tines at the open front, the tape roll exposed at the open front of the cavity for removal by a user for taping of the articles with the wrapping paper roll, the upper clamp frame member further including an L-shaped surface integrally formed as part of the upper clamp frame member and provided directly beneath the cavity, the L-shaped surface comprising a longer elongate surface having a ribbed elastomeric covering along a length of the longer elongate surface that bears against the top surface of the table with the clamp apparatus attached to the vertical side ledge of the table, and a shorter vertical side surface extending downward for flush engagement with the vertical side ledge of the table, the upper clamp frame member further including a rear upper flange member integrally formed therein, the rear upper flange member providing a grip surface for grasping by a thumb of the user, and a pivotable lower clamp member attached to the upper clamp frame member at a hinge axle, the lower clamp member adapted to be actuated against spring pressure so as to open downward relative to the upper clamp frame member and attach the clamp apparatus to the table, with the lower clamp member in contact with the underside surface of the table with bearing pressure, with the ribbed elastomeric covering of the longer elongate surface of the upper clamp frame member in contact with the top surface of the table with bearing pressure, and with the shorter vertical side surface of the upper clamp frame member in flush engagement to the vertical side ledge of the table, so that the spindle is parallel to the top surface of the table.]

[2. The system of claim 1, wherein each lower clamp member further includes an arm extending between a lower rear flange end for grasping by the user and a distal foot with a contact element on the foot for bearing against the underside surface of the table, the contact element further including a ribbed elastomeric covering thereon that bears against the underside surface of the table with the clamp apparatus attached to the vertical side ledge of the table.]

[3. The system of claim 2, wherein each lower rear flange end includes a grip surface for grasping by a finger of the user to actuate the lower clamp member relative to the upper clamp frame member.]

[4. The system of claim 2, wherein each upper clamp frame member further includes a first pair of spaced parallel posts extending downward from a lower end of the rear upper flange member, each post of the first pair of posts having a central hole therethrough, and each lower clamp member further includes:

a second pair of spaced parallel posts extending upward from the lower rear flange end, each post of the second pair of posts having a central hole therethrough, the first and second pairs of posts in spaced parallel relation to one another such that all the central holes are aligned, the hinge axle horizontally oriented between the first and second pairs of posts and connected thereto through the central holes of the first and second pairs of posts, and a spring attached to hinge axle and having opposed tine ends, each respective tine end biased against the respective upper rear flange end or lower rear flange end.]

[5. The system of claim 1, wherein each upper clamp frame member includes a curved trough formed therein and located forward of the spindle and cavity, the trough terminating in an island element that is integrally formed as part of each upper clamp frame member, with spacing provided by the trough between the cavity and the island element providing user access to pull tape from the tape roll.]

[6. The system of claim 5, wherein a front facing surface of each island element includes a serrated blade thereon for cutting tape on the tape roll at a desired length.]

7. A system for facilitating the wrapping and taping of articles with wrapping materials, comprising:

a pair of distinct and separate clamp apparatuses with no physical connective structure connecting the two distinct and separate clamp apparatuses together as an integral unit, each of the clamp apparatuses adapted to be secured in opposed, facing spaced relation to the other of the pair of clamp apparatuses against a vertical side ledge of a table for securing a wrapping paper roll between the clamp apparatuses, the table having a top surface and an underside surface, each clamp apparatus including:

a fixed upper clamp frame member adapted to contact the top surface of the table and including an elongate spindle integrally formed on an inner facing side surface of the upper clamp frame member, the spindle extending from the inner facing side surface toward the other clamp apparatus, the upper clamp frame member including a cavity adapted to retain a tape roll within the cavity that is accessible for the taping of the articles with the wrapping paper roll, the cavity integrally formed in an outer side surface of the upper clamp member opposite that of the inner facing side surface having the spindle extending therefrom, the upper clamp frame member further including an L-shaped surface integrally formed as part of the upper clamp frame member and provided directly beneath the cavity, the L-shaped surface comprising a longer elongate surface having a [ribbed elastomeric covering] *bearing surface* along a length of the longer elongate surface that bears against the top surface of the table with the clamp apparatus attached to the vertical side ledge of the table, and a shorter vertical side surface extending downward for flush engagement with the vertical side ledge of the table, and a pivotable lower clamp member attached to the upper clamp frame member at a hinge axle, the lower clamp member adapted to be actuated against spring pressure to open relative to the fixed upper clamp frame member and attach the clamp apparatus to the table.

8. The system of claim 7, wherein each upper clamp frame member includes a curved trough formed therein and located forward of the spindle and cavity, the trough terminating in an island element that is integrally formed as part of each upper clamp frame member, with spacing provided by the trough between the cavity and the island element providing user access to pull tape from the tape roll.

9. The system of claim 8, wherein a front facing surface of each island element includes a serrated blade thereon for cutting tape on the tape roll at a desired length.

10. The system of claim 7, wherein, with each clamp apparatus attached to the table:

the lower clamp member is in contact with the underside surface of the table with bearing pressure, the [ribbed elastomeric covering] *bearing surface* of the longer elongate surface of the upper clamp frame member is in contact with the top surface of the table with bearing pressure, and the shorter vertical side surface of the upper clamp frame member is in flush engagement to the vertical side ledge of the table.

11. The system of claim 7, wherein the cavity is an accessible recessed cavity that is integrally formed in the upper clamp frame member on a side opposite that of the spindle and has an open front, and the cavity further includes a pair of spaced tines integrally formed as part of the upper clamp frame member, the spaced tines extending outward from the cavity toward the open front, the spaced tines adapted to retain a tape roll that is insertable at the open front by a user for taping of the articles with the wrapping paper roll, and the tape roll being removable at the open front by the user.

*12. A system for facilitating the wrapping and taping of one or more articles with wrapping materials, comprising:*

*a pair of distinct and separate clamp apparatuses with no physical connective structure connecting the two distinct and separate clamp apparatuses together as an integral unit, each of the clamp apparatuses adapted to be secured in opposed, facing spaced relation to the other clamp apparatus of the pair of clamp apparatuses at a side of a table for securing a wrapping paper roll between the pair of clamp apparatuses, the table having a top surface and an underside surface, each clamp apparatus including:*

*an upper clamp frame member comprising a first side that faces toward the other clamp apparatus of the pair of clamp apparatuses, a second side that faces away from the other clamp apparatus of the pair of clamp apparatuses, a spindle extending from the first side toward the other clamp apparatus of the pair of clamp apparatuses, a first surface having a bearing surface along a length of the first surface that bears against the top surface of the table with the clamp apparatus attached to a side of the table, and a second surface extending downward relative the first surface for engagement with the side of the table,*

*a lower clamp member attached to the upper clamp frame member at a hinge, the lower clamp member actuatable against a spring pressure to open relative to the upper clamp frame member and attach the clamp apparatus to the table,*

*wherein at least one of the upper clamp frame members includes a cavity adapted to retain a tape roll within the cavity that is accessible for the taping of the wrapping paper roll, the cavity integrally formed in the second side of the at least one of the upper clamp frame members opposite the first side having the spindle extending therefrom, wherein the bearing surface is directly beneath the cavity.*

*13. The system of claim 12, wherein each lower clamp member further includes an arm extending between a lower rear flange end for grasping by a user and a distal foot with a contact element on the foot for bearing against the underside surface of the table, the contact element further including a second bearing surface thereon that bears against the underside surface of the table with the clamp apparatus attached to the table.*

*14. The system of claim 13, wherein each lower rear flange end includes a grip surface for grasping by a finger of the user to actuate the lower clamp member relative to the upper clamp frame member.*

*15. The system of claim 12, wherein*

*each upper clamp frame member further includes a first pair of spaced parallel posts extending toward the lower clamp member, each post of the first pair of posts having a central hole therethrough, and*

*each lower clamp member further includes:*

*a second pair of spaced parallel posts extending toward the upper clamp frame member, each post of the second pair of posts having a central hole therethrough, the first and second pairs of posts in spaced parallel relation to one another such that all the central holes are aligned,*

*the hinge horizontally oriented between the first and second pairs of posts and connected thereto through the central holes of the first and second pairs of posts, and*

*a spring having opposed tine ends, each respective tine end biased against the upper clamp frame member or lower clamp member.*

*16. The system of claim 12, wherein the at least one of the upper clamp frame members includes a curved trough formed therein and located forward of the spindle and cavity, the trough terminating in an island element that is integrally formed as part of the at least one of the upper clamp frame members, with spacing provided by the trough between the cavity and the island element providing user access to pull tape from the tape roll.*

*17. The system of claim 16, wherein a front facing surface of each island element includes a serrated blade thereon for cutting tape on the tape roll at a desired length.*

*18. A system for facilitating the wrapping and taping of articles with wrapping materials, comprising:*

*a pair of distinct and separate clamp apparatuses with no physical connective structure connecting the two distinct and separate clamp apparatuses together as an integral unit, each of the clamp apparatuses adapted to be secured in opposed, facing spaced relation to the other clamp apparatus of the pair of clamp apparatuses to a table for securing a wrapping paper roll between the clamp apparatuses, the table having a top surface and an underside surface, each clamp apparatus including:*

*an upper clamp frame member adapted to contact the top surface of the table, the upper clamp frame member including (i) a spindle integrally formed on an inner facing side surface of the upper clamp frame member, the spindle extending from the inner facing side surface toward the other clamp apparatus of the pair of clamp apparatuses, (ii) a first*

*surface having a bearing surface along a length of the first surface that bears against the top surface of the table with the clamp apparatus attached to a side of the table, and (iii) a second surface extending downward relative the first surface for engagement with the side of the table,*

*a hinge, and*

*a lower clamp member attached to the upper clamp frame member at the hinge, the lower clamp member adapted to be actuated against spring pressure to open relative to the upper clamp frame member to attach the clamp apparatus to the table,*

*wherein at least one of the upper clamp frame members includes a cavity adapted to retain a tape roll within the cavity that is accessible for the taping of the wrapping paper roll, the cavity integrally formed in a second side of the at least one of the upper clamp frame members opposite the inner facing side surface having the spindle extending therefrom, wherein the bearing surface is directly beneath the cavity.*

*19. The system of claim 18, wherein each lower clamp member further includes an arm extending between a lower rear flange end for grasping by a user and a distal foot with a contact element on the foot for bearing against the underside surface of the table, the contact element further including a second bearing surface thereon that bears against the underside surface of the table with the clamp apparatus attached to the table.*

*20. The system of claim 19, wherein each lower rear flange end includes a grip surface for grasping by a finger of the user to actuate the lower clamp member relative to the upper clamp frame member.*

*21. The system of claim 18, wherein*

*each upper clamp frame member further includes a first pair of spaced parallel posts extending toward the lower clamp member, each post of the first pair of posts having a central hole therethrough,*

*each lower clamp member further includes a second pair of spaced parallel posts extending toward the upper clamp frame member, each post of the second pair of posts having a central hole therethrough, the first and second pairs of posts in spaced parallel relation to one another such that all the central holes are aligned,*

*the hinge is horizontally oriented between the first and second pairs of posts and connected thereto through the central holes of the first and second pairs of posts, and*

*the hinge comprises a spring having opposed tine ends, each respective tine end biased against the upper clamp frame member or lower clamp member.*

*22. The system of claim 18, wherein the at least one of the upper clamp frame members includes a curved trough formed therein and located forward of the spindle and cavity, the trough terminating in an island element that is integrally formed as part of the at least one of the upper clamp frame members, with spacing provided by the trough between the cavity and the island element providing user access to pull tape from the tape roll.*

*23. The system of claim 22, wherein a front facing surface of each island element includes a serrated blade thereon for cutting tape on the tape roll at a desired length.*

* * * * *